United States Patent [19]

Mason

[11] 4,221,984
[45] Sep. 9, 1980

[54] STATOR FOR MULTIPLE ROTOR D. C. MAGNETIC MOTOR

[76] Inventor: Elmer B. Mason, 901 Vickie Dr., Del City, Okla. 73115

[21] Appl. No.: 2,262

[22] Filed: Jan. 10, 1979

[51] Int. Cl.² ........................................... H02K 16/00
[52] U.S. Cl. .................................... 310/112; 310/114; 310/257
[58] Field of Search ............... 310/112, 114, 124, 126, 310/254, 257

[56] References Cited

U.S. PATENT DOCUMENTS

| | | | |
|---|---|---|---|
| 374,959 | 12/1887 | Gray | 310/112 |
| 3,723,796 | 3/1973 | Mason | 310/257 X |
| 3,757,149 | 9/1973 | Holper | 310/11A |

FOREIGN PATENT DOCUMENTS 487529  4/1970  Switzerland ............................ 310/257

Primary Examiner—Mark O. Budd
Attorney, Agent, or Firm—Robert K. Rhea

[57] ABSTRACT

At least one armature is supported between parallel magnetic pole plates of opposite polarity energized by a coil extending therebetween. A plurality of equally spaced finger-like pole pieces, connected with the respective pole plate, extend toward the opposite pole plate in interdigitated relation parallel with the axis of the armature and in close spaced relation with respect to circumferential portions of its periphery.

9 Claims, 13 Drawing Figures

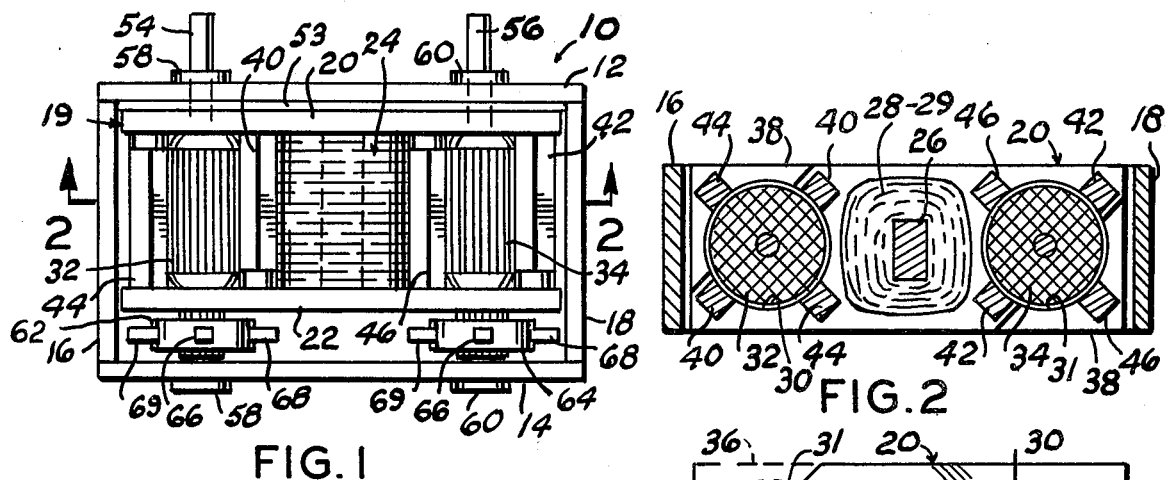
FIG. 1
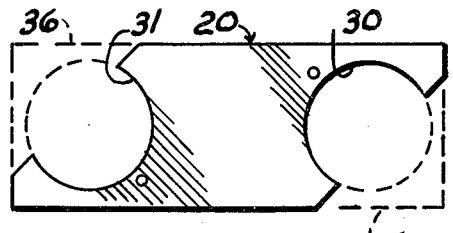
FIG. 2
FIG. 3
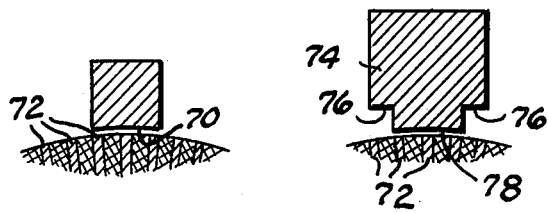
FIG. 5  FIG. 6
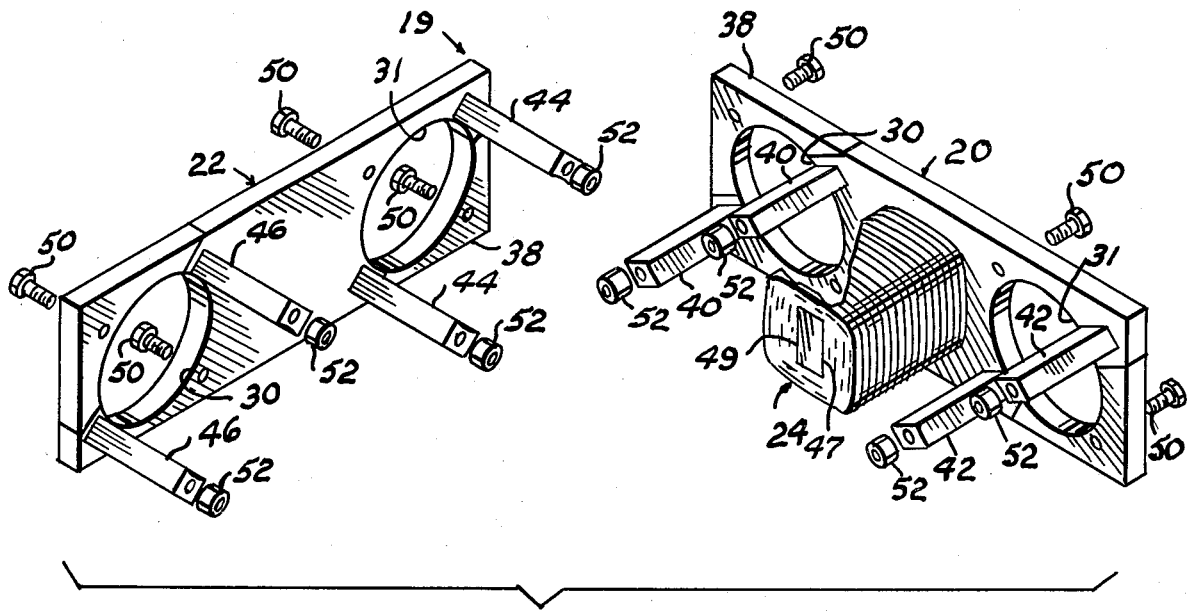
FIG. 4

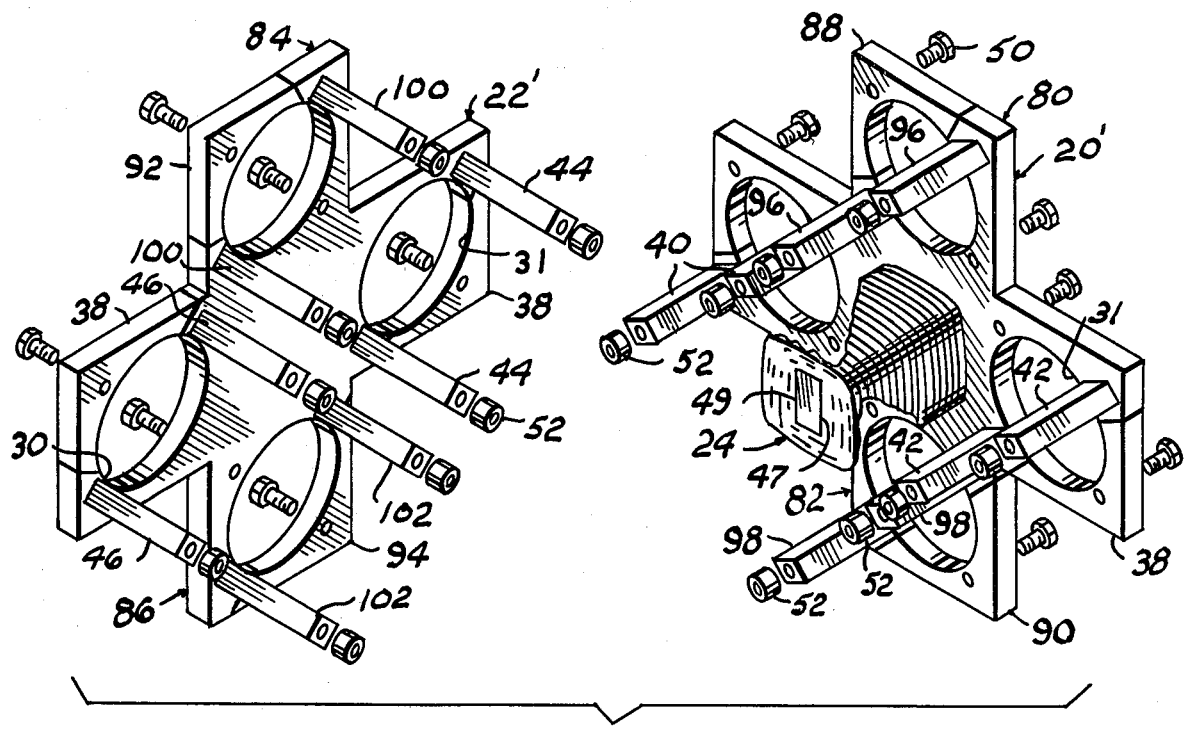
FIG. 7
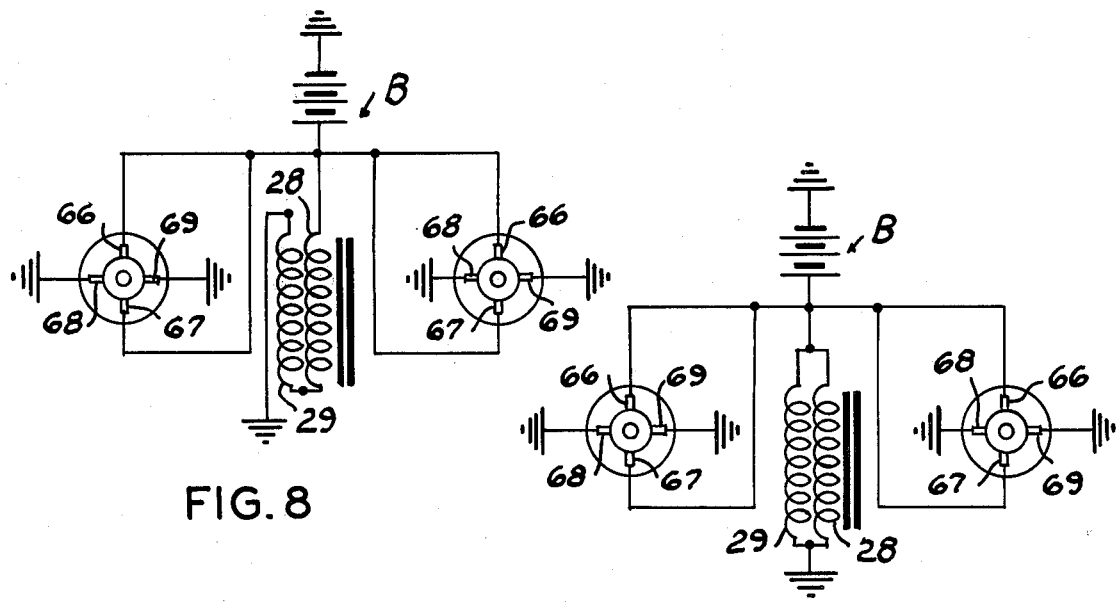
FIG. 8
FIG. 9

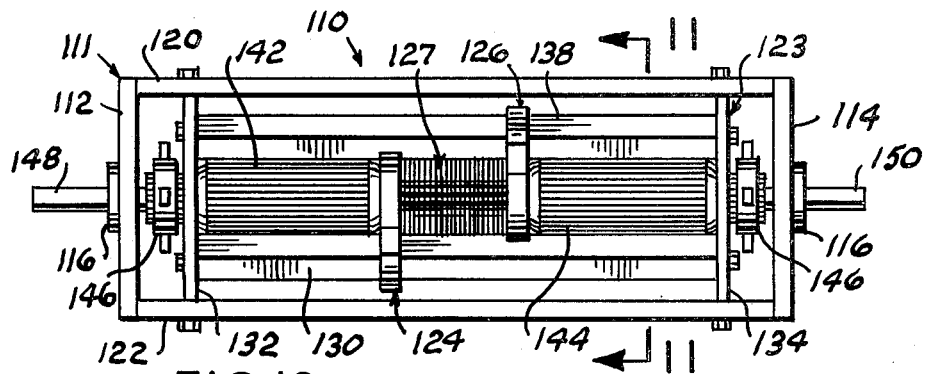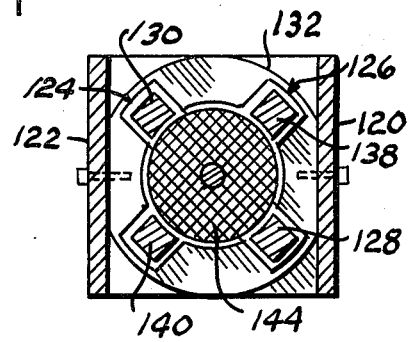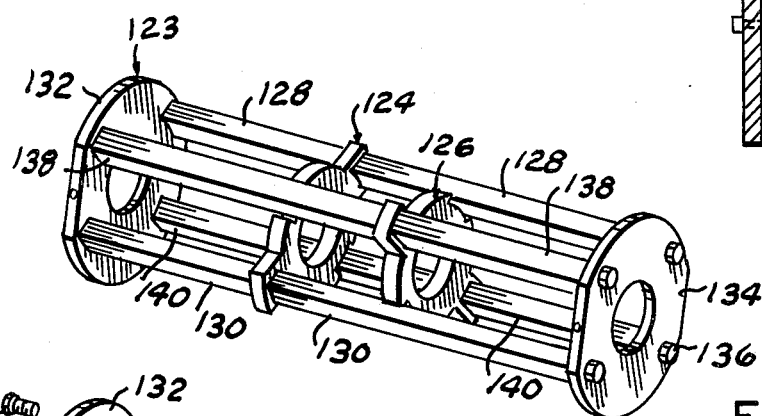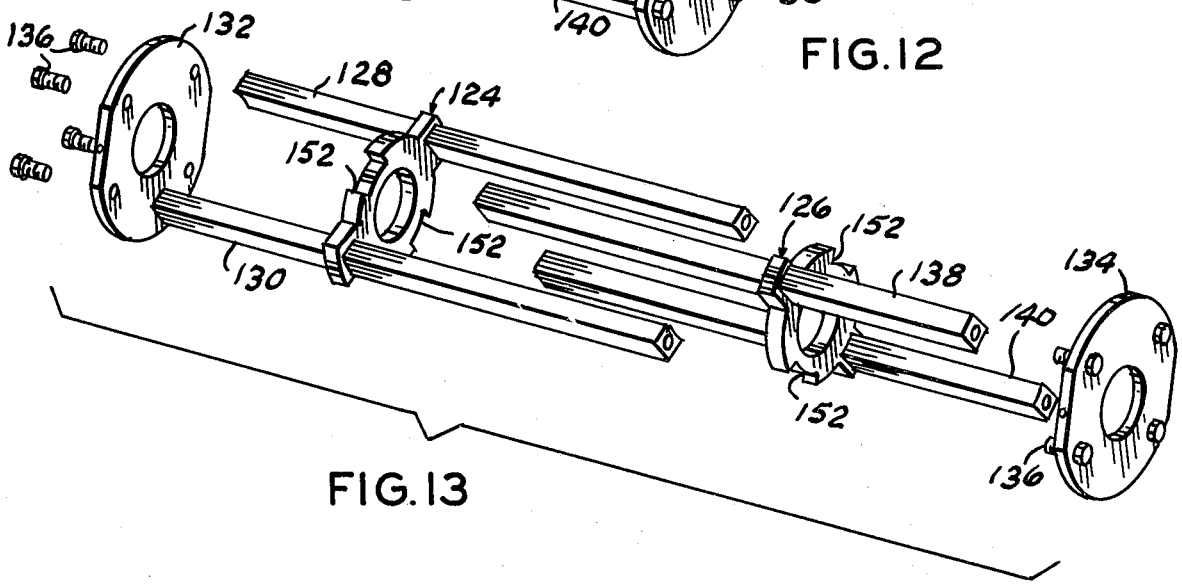

STATOR FOR MULTIPLE ROTOR D. C. MAGNETIC MOTOR

BACKGROUND OF THE INVENTION

1. Field of the Invention

The present invention relates to direct current motors and more particularly to a magnetic motor.

A direct current motor constructed in accordance with this invention finds particular application in industry where a high torque direct current motor, having an exceptionally high starting torque, is needed. For example, for starting the diesel engine of a relatively large size truck-tractor commonly referred to as a "big cam Diesel". The engines of these truck-tractors are usually left running in cold weather when the truck-tractor rig is parked out-of-doors for the reason that when the motor and motor oil becomes cold the engine cannot be turned over or started with any presently available starter. This results in an unnecessary waste of Diesel fuel as well as wearing the engine. Further, a direct current motor of this type is needed for mounting on the "dead" axle of a truck-tractor to assist the internal combustion engine on long uphill grades.

2. Description of the Prior Art

The most pertinent prior patents are believed to be my U.S. Pat. Nos. 3,651,355 and 3,723,796. These patents generally disclose multiple armature motors having the axes of the respective armatures arranged in parallel normal to the axis of a coil or coils as in U.S. Pat. No. 3,651,355 or parallel with the coil axis as in U.S. Pat. No. 3,723,796 with both patents featuring magnetic pole pieces surrounding diametrically opposite substantial portions of the respective armature periphery. This partial armature wrap-around feature of the magnetic pole pieces results in a back electromotive force (e.m.f.) opposing the magnetic attractive e.m.f. on the armature winding thus reducing the efficiency of the motor and reducing its torque. In the present invention the back e.m.f. is eliminated by reducing the area of magnetic flux acting on the armature to an arc of the armature circumference spanning the number of the armature segments spanned by the respective armature brush contacting the cooperating commutator segments. This results in forming a motor which has a substantially increased torque when compared with a conventional similar size or rated A.C. or D.C. motor having the major portion of its armature periphery spanned by magnetic pole pieces or conventional field coils.

Other direct current high torque motors presently in use are generally characterized by the disadvantage of a relatively high amperage drag. This feature is particularly undesirable where, for example, the motor is utilized as the prime mover of a vehicle and has a constant amperage drag at a constant voltage whether climbing, cruising or coasting downhill. This invention provides a motor having an amperage drag in proportion to the load and in which the amperage drag is automatically reduced when a cruising speed is reached and is further reduced to a minimum under little or no load.

SUMMARY OF THE INVENTION

In one embodiment a pair of armatures are supported in parallel spaced relation between a pair of parallel spaced-apart magnetic pole plates energized by a central coil extending between the pole plates with its axis normal to the planes of the plates. A plurality of elongated pole pieces connected with the respective pole plate project toward and terminate in spaced relation with respect to the opposite pole plate in interdigitated circumferential equally spaced relation about the periphery of the respective armature parallel to its axis and in close spaced relation with respect to its periphery. That portion of each elongated pole piece adjacent the periphery of the armature is limited to a width no greater than the transverse dimension of any three segments forming the armature winding. The respective elongated pole pieces connected with the respective pole plate form magnetic poles of one polarity opposite the polarity of the pole pieces on the opposite pole plate to establish magnetic flux circuits for the respective armatures. The pole plate energizing coil is preferably wound at least two-in-hand about a rectangular coil core to provide an even number of wraps about the core. These coil forming wires are connected in series or in parallel to a source of direct current and brushes mounted on the respective commutator.

In another embodiment, the axis of the two armatures are arranged in coaxial alignment normal to and on opposing sides a parallel opposite polarity pole plates having an energizing coil centrally disposed coaxially therebetween. The respective elongated pole pieces, connected with the respective pole plate, project in opposite directions with respect to the respective pole plate in similar interdigitated circumferentially spaced relation about the periphery of the respective armature.

The principal object of this invention is to provide a direct current motor having a plurality of armatures utilizing magnetic flux establishing a plurality of magnetic poles of opposite polarity disposed in spaced-apart parallel relation with respect to the longitudinal axis of the respective armature for providing high torque and cool running characteristics.

BRIEF DESCRIPTION OF THE DRAWINGS

FIG. 1 is a top view of one embodiment;

FIG. 2 is a vertical cross sectional view taken substantially along the line 2—2 of FIG. 1;

FIG. 3 is an elevational view of one of the magnetic pole plates;

FIG. 4 is an exploded perspective view of the pole plates illustrating the relative position of the magnetic coil and magnetic pole pieces;

FIG. 5 is a fragmentary cross sectional view illustrating the transverse magnetic flux area between one of the magnetic pole pieces with respect to armature winding segments;

FIG. 6 is a view similar to FIG. 5 illustrating a larger size pole piece and the manner of limiting the transverse magnetic flux area between the pole piece and armature segments;

FIG. 7 is a view similar to FIG. 4 illustrating the manner of extending the pole plates and adding a second pair of armatures;

FIGS. 8 and 9 are wiring schematics;

FIG. 10 is a top view of another embodiment comprising a pair of axially aligned armatures;

FIG. 11 is a vertical cross sectional view taken substantially along the line 11—11 of FIG. 10;

FIG. 12 is a perspective view of FIG. 10 with the coil and armatures removed for clarity; and, FIG. 13 is an exploded perspective view of FIG. 12.

DESCRIPTION OF THE PREFERRED EMBODIMENTS

Like characters of reference designate like parts in those figures of the drawings in which they occur.

In the drawings:

Referring to FIGS. 1 through 6, the reference numeral 10 indicates one embodiment of the motor which is rectangular in general configuration including a motor housing formed from nonmagnetic material comprising end walls 12 and 14 joined by side walls 16 and 18. The housing supports a motor framework 19 comprising a pair of generally rectangular identical magnetic material pole plates 20 and 22 disposed in parallel spaced-apart relation having a magnetic coil 24 centrally disposed therebetween. The coil 24 comprises a magnetic material core 26, preferably rectangular in transverse section, for the purposes presently explained, which is rigidly joined centrally at one end, to one of the pole plates and abuts the other pole plate when the motor is assembled as presently described.

The coil 24 is formed by a plurality of wraps or runs of wire wound one-in-hand or by pairs about the periphery of the core 26. In the example shown, a pair of wires 28 and 29 (FIGS. 8 and 9) are wound two-in-hand. The number of wraps or runs of the wires 28 and 29 is preferably an even number for providing maximum magnetic flux. Each of the pole plates 20 and 22 are provided with a transverse aperture 30 and 31 in its respective end portions. The diameter of the apertures is determined by the diameter of respective end portions of armatures 32 and 34 to be loosely surrounded at their respective end portions and to form a desired air gap between the periphery of each armature and the respective magnetic pole pieces described hereinbelow. As shown by dotted lines (FIG. 3), selected diagonally opposite corner portions 36 of the respective pole plates 20 and 22 are cut away for the purposes of dividing the magnetic flux path to flow through the armatures 32 and 34 via pole pieces, as presently explained, and for reducing heat generated by magnetic flux energizing the armatures. These pole plate cut off portions 36 are replaced by identically sized and shaped sections of nonmagnetic metal or material 38 (FIG. 2) rigidly joined to the respective pole plate to provide rigidity for the motor framework.

The pole plates form opposite poles, for example, the plate 20 forms of North pole and the pole plate 22 forms a South pole when energized by the coil 24. When positioned for assembling the framework 19 one of the pole plates is reversed end-to-end with respect to the other pole plate so that the nonmagnetic sections 38 confront magnetic material portions of the opposite pole plate (FIG. 4).

Each of the pole plates 20 and 22 are provided with pairs of pole pieces, preferably rectangular in transverse section, normal to the plane of the respective plate and project toward the opposite plate. For example, one pair of pole pieces 40 are connected at one end to the magnetic material portion of the pole plate 20 adjacent and in diametric opposition with respect to the aperture 30. Similarly, a second pair of pole pieces 42 are connected to the magnetic portion of the pole piece 20 adjacent and in diametric opposition with respect to the aperture 31. Third and fourth pairs of magnetic pole pieces 44 and 46 are similarly connected to the magnetic portion of the pole plate 22 adjacent the respective aperture 31 and 30 with the pairs of pole pieces 40 and 46 disposed in 90° spaced relation with respect to the cooperating pairs of pole pieces 40 and 42 so that when the plates are disposed in framework assembled relation, as shown by FIG. 1, the respective pairs of pole pieces 40-44 and 42-46 form cooperating opposing polarity assemblies arranged in equally spaced circumferential relation about the periphery of the respective armatures 32 and 34.

As is well known, when current flows through the coil wires 28 and 29, the coil core 26 forms a magnet having North and South poles at its respective ends according the direction of current which magnetizes the respective pole plates 20 and 22. Assuming current flow in the wires 28 and 29, in the direction to generate North polarity in the pole plate 20, the magnetic force, represented by the vertical side face 47 of the coil core, as viewed in FIG. 4, at its end portion contacting the pole plate 20, is induced into the end portion of the pole plate 20 having the aperture 31 therein. This force 47 is divided by the aperture 31 and enters the pair of pole pieces 42. The nonmagnetic material 38, at this end portion of the pole plate interrupts the magnetic flux path tending to surround the aperture 31 which, in addition to reducing heat during operation of the motor, directs the full magnetic flux to the pair of pole pieces 42 and builds up a magnetic field and e.m.f. on the windings of the rotor or armature 34. Similarly, the magnetic force represented by the opposite vertical face 49 of the core, at its end in contact with the plate 20, magnetizes the other end of the pole plate 20 containing the aperture 30 so that the full magnetic flux is induced into the pair of pole pieces 40.

When the coil core 26 is in abutting relation with respect to the other pole plate 22, the magnetic forces represented by the opposing vertical surfaces 47 and 49 of the coil core are similarly induced in the respective end portions of the pole plate 22. For example, the force, represented by the coil core surface 47, moves into the left end portion of the pole plate 22, as viewed in FIG. 4, with this force being divided by the aperture 30 magnetizing the pair of pole pieces 46. Similarly, the coil core force indicated by the vertical surface 49 induces magnetic force in the other end of the pole plate 22 which is divided by the aperture 31 and magnetizes the pair of pole pieces 44.

The length of each pole piece of the pairs of pole pieces are less than the axial length of the coil 24 and its core 26 a distance equal to four times the air gap between the periphery of either armature and the adjacent surface of the respective overlying pole pieces. The pole plates 20 and 22 are rigidly connected together during assembly of the motor framework by a plurality of nonmagnetic bolts or screws 50, one for each pole piece, projecting through the respective pole plate and threadedly connected axially with the respective pole piece for the purpose of maintaining the respective pole piece parallel with the axis of the respective armature. A like plurality of nonmagnetic spacers 52 surround the respective screw 50 in the spacing between the respective pole piece and the adjacent pole plate. the framework 19 is rigidly secured to the housing as by bolting the pole plate 20 to the housing end wall 12 across a nonmagnetic spacer 53.

The armatures 32 and 34, each have a shaft 54 and 56, respectively supported by a pair of bearings 58 and 60, respectively connected with the housing end walls 12 and 14. A pair of brush mounts 62 and 64, each containing a plurality, four in the example shown, of circumferentially spaced brushes 66, 67, 68 and 69, surround the commutator of the respective armature.

As illustrated by FIG. 5, the transverse width of the respective pole piece surface 70, facing the winding of the respective aramture, is no greater than the transverse dimension spanning any three segments 72 of a span seven armature. This demension is cooperatively related to the number of commutator segments spanned by the respective brush. Stated another way, the number of armature winding segments 72 transversely spanned by each pole piece is equal to the number of commutator segments spanned by the respective brush.

The magnetic flux between the pole pieces and armatures may be increased by enlarging the transverse dimension of the pole piece, as shown by FIG. 6, at 74. However, in this event opposing longitudinal edge portions of the pole piece 74 facing the armature are removed, as indicated by the recesses 76, so that the surface 78 of the pole piece 74 remains a transverse dimension equal with the dimension across any three armature winding segments 72 of a span seven armature.

As illustrated by FIG. 8, the coil forming wires 28-29 are connected in series with the wire 28 connected to the positive terminal of a battery B and the wire 29 connected to ground. The battery positive terminal is also connected in parallel to diametrically opposite brushes 66 and 67. The other two brushes 68 and 69 are connected to ground.

As illustrated by FIG. 9, the coil wires 28 and 29 may be connected in parallel to provide maximum torque for the motor. Obviously, substantially conventional switch means may be interposed in the wiring for selectively connecting the coil wires in series or in parallel for operating the motor in accordance with the load applied. Similarly, other controls, now shown, may be incorporated to advance or retard the respective brush mounts for increasing or decreasing the angular rate of rotation of the armatures.

Referring also to FIG. 7, the reference numerals 20' and 22' indicate a pair of pole plates, each substantially cross-shaped in general configuration which form a modified version of the motor framework. The two pole plates 20' and 22' are each formed by integrally connecting a substantially square section of plate metal 80-82 and 84-86 to the medial edge portion of the respective previously described pole plates 20 and 22. These pole plate extensions 80-82 and 84-86 are similarly centrally bored for loosely surrounding respective end portions of an additional pair of armatures, not shown, in the manner described hereinabove for the armatures 32 and 34. Similarly, selected corner portions of the respective added plates 80-82 and 84-86 are cut away and replaced by identically shaped nonmagnetic metallic members 88-90 and 92-94 for the purposes of dividing the magnetic flux path, minimizing heat and providing support for magnetic pole pieces. Each of the added pole plate sections are similarly provided with pairs of pole pieces 96-98 and 100-102 arranged in similar diametric opposition about the respective armature receiving opening with one end of the respective pole piece projecting toward the opposite pole plate in interdigitated spaced relation thus forming a four-armature direct current motor energized by the coil 24.

The magnetic forces of the other surfaces of the coil core normal to its vertical surfaces 47 and 49 similarly are divided and induced into the pairs of pole pieces 96-98 and 100-102 in the manner previously described for the forces indicated by the surfaces 47 and 49.

A motor formed in accordance with the drawings shown by FIG. 7 has particular application when used for powering a vehicle wherein two of the armatures may be employed for cruising speeds and a third or fourth armature energized by means of a magnetic clutch, not shown, for applying additional torque to the vehicle driving wheels as when accelerating or ascending a grade.

Referring now to FIGS. 10 through 13, the numeral 110 indicates another embodiment of the motor having a housing 111 formed from nonmagnetic material comprising end plates 112 and 114, each centrally supporting bearings 116 and joined by side plates 120 and 122. The housing encompasses a generally cylindrical motor framework 123 including a pair of spaced-apart parallel generally circular magnetic material pole plates 124 and 126 normal to the longitudinal axis of the housing and having a coil 127 therebetween with its axis normal to the planes of the pole plates. The pole plate 124 is provided with a pair of diametrically opposite outstanding lugs integrally connected with a pair of equal length elongated parallel pole pieces 128 and 130 intermediate their ends. The pole pieces 128 and 130 are normal to the plane of the pole plate 124 and are connected at their respective ends with a pair of centrally apertured nonmagnetic discs 132 and 134 by nonmagnetic bolts or screws 136. The other pole plate 126 is similarly provided with a pair of outstanding lugs integrally connected with another pair of elongated parallel pole pieces 138 and 140 intermediate their ends with one end of these pole pieces 138 and 140 connected with the disc 134 and their opposite ends projecting beyond the coil 127 and the other pole plate 124 and connected with the disc 132. The pole plate 126 is disposed so that its pole pieces 138 and 140 are spaced 90° with respect to the pole pieces 128 and 130.

A pair of armatures 142 and 144 are disposed in axial alignment within the housing coaxial with the coil 127. A peripheral portion of each armature 142 and 144 is disposed in close spaced relation with respect to the respective pairs of pole pieces 128-130 and 138-140. The transverse dimension of the surface of the respective pole piece facing the armature is limited to the ratio set forth hereinabove for the motor 10.

The disc apertures loosely surround the commutator end portion of the respective armature. A pair of brush holders 146 similarly provided with brushes surround the respective armature commutator between the housing ends and pole piece supporting discs 132 and 134, respectively. The respective armature shaft 148 and 150 form a drive shaft supported by the bearings 116 projecting beyond the housing ends 112 and 114. The other end of the armature shafts may be axially interconnected to form a single double armature motor or may be journalled by bearings, not shown, supported by the pole plates 124 and 126 to form a dual motor.

As shown more clearly by FIG. 13, a peripheral portion of the respective pole plate is cut away to form diametric opposite recesses 152 to increase the spacing between adjacent surfaces of the pole pieces and the respective pole plate.

Obviously the invention is susceptible to changes or alterations without defeating its practicability. Therefore, I do not wish to be confined to the preferred embodiment shown in the drawings and described herein.

I claim:

1. A motor assembly, comprising:

magnetic motor framework means including a pair of spaced-apart plates each having at least one transverse aperture coaxially aligned with the aperture in the opposite plate;

an armature adjacent each plate in axial alignment with the aperture, said armature being characterized by a winding having a plurality of axially extending segments and a commutator having a like plurality of segments and including a pair of commutator brushes each transversely spanning a plurality of commutator segments;

housing means including bearings encompassing said framework for journalling said armature, said framework plates each having at least one rigidly connected pole piece adjacent its aperture normal to the plane of the plate and projecting parallel with the armature axis and in opposition with respect to the pole piece on the opposite plate, each said pole piece being characterized by a transverse surface facing the periphery of said armature, the transverse dimension of said transverse surface being no greater than the transverse dimension of a plurality of armature winding segments equal in number to the number of cummutator segments spanned by the respective brush; and, magnetic field producing means connected with said plates for establishing a magnetic field, whereby said plates and their respective pole pieces are magnetized with respectively different polarities to provide a magnetic flux circuit across the periphery of said armature.

2. The motor assembly according to claim 1 in which said pole pieces are elongated and project equidistant from the respective said plate a dimension substantially equal with respect to the axial length of said armature winding segments; and, means connected with the end portion of each pole piece opposite the respective said plate for maintaining said pole pieces in parallel spaced relation.

3. The motor assembly according to claim 2 in which said magnetic field producing means includes:

a coil core extending between and contacting said plates; and, a coil coaxially surrounding said coil core.

4. The motor assembly according to claim 2 or 3 in which each said pole piece projects beyond the opposing surfaces of each said plate a distance at least equal with respect to the axial length of said armature winding segments and in which said connected means comprises:

a nonmagnetic disc abutting the respective ends of said pole pieces; and, nonmagnetic bolt means connecting said discs with the respective said pole piece.

5. The motor assembly according to claim 4 in which said armature includes a pair of armatures having their axes disposed in coaxial alignment.

6. The motor assembly according to claim 3 in which said connected means comprises:

nonmagnetic spacer and bolt means connecting the respective said pole piece with said opposite plate.

7. The motor assembly according to claim 6 in which the spacing between the respective said pole piece and the opposite said plate is four times greater than the air gap between the respective pole piece and the periphery of said armature.

8. A motor assembly, comprising:

magnetic motor framework means including a pair of elongated spaced-apart plates having coaxially aligned apertures in their respective end portions;

a pair of armatures each having a winding and having an end portion loosely disposed within the respective aperture, each armature of said pair of armatures being characterized by a winding having a plurality of axially extending segments and a commutator having a like plurality of segments and including two pairs of commutator brushes with each brush of the respective pairs of brushes spanning a plurality of the commutator segments;

housing means including bearings encompassing said framework for journalling said pair of armatures, said framework plates each having at least one pair of diametrically opposed elongated integrally connected pole pieces adjacent the respective aperture normal to the plane of the respective plate and projecting toward the opposite plate in parallel interdigitated circumferentially spaced relation with respect to the periphery of the respective armature, each pole piece of the respective pairs of pole pieces being characterized by a transverse surface facing the periphery of the respective armature, the transverse dimension of said transverse surface being no greater than the transverse dimension of a plurality of armature winding segments equal in number to the number of commutator segments spanned by the respective brush; and, magnetic field producing means including a coil having a core for establishing a magnetic field, whereby said plates are magnetized with respectively opposite polarities and the magnetic force emanating from opposing surfaces of said coil core toward the respective end portions of each said plate are divided by the respective aperture therein and induced in the respective adjacent pairs of pole pieces and form a magnetic flux electromotive force on the winding of the respective armature.

9. The motor assembly according to claim 8 in which each said pole piece connected with the respective said plate terminates in spaced relation with respect to the opposite plate a distance equal to four times the dimension of the air gap between the pole pieces and the periphery of the respective armature and further including:

nonmagnetic means interposed in the spacing between said pole pieces and said plates for maintaining said pole pieces in parallel spaced relation.

* * * * *